(12) United States Patent
Feng

(10) Patent No.: US 12,069,372 B2
(45) Date of Patent: Aug. 20, 2024

(54) GIMBAL CONTROL METHOD AND APPARATUS, CONTROL TERMINAL AND AIRCRAFT SYSTEM

(71) Applicant: AUTEL ROBOTICS CO., LTD., Guangdong (CN)

(72) Inventor: Yinhua Feng, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 260 days.

(21) Appl. No.: 17/455,748

(22) Filed: Nov. 19, 2021

(65) Prior Publication Data

US 2022/0078349 A1    Mar. 10, 2022

Related U.S. Application Data

(63) Continuation of application No. PCT/CN2020/091621, filed on May 21, 2020.

(30) Foreign Application Priority Data

May 22, 2019   (CN) .......................... 201910430485.0

(51) Int. Cl.
*H04N 23/695*    (2023.01)
*G03B 15/00*     (2021.01)
(Continued)

(52) U.S. Cl.
CPC ......... *H04N 23/695* (2023.01); *G03B 15/006* (2013.01); *G03B 17/561* (2013.01);
(Continued)

(58) Field of Classification Search
CPC ....... H04N 23/695; G06T 7/70; G03B 15/006
See application file for complete search history.

(56) References Cited

U.S. PATENT DOCUMENTS

2019/0011922 A1*  1/2019  Feng ..................... G05D 1/0094
2020/0104598 A1*  4/2020  Qian ..................... G06V 20/176

FOREIGN PATENT DOCUMENTS

| CN | 107710283 A | 2/2018 |
| CN | 108038417 A | 5/2018 |

(Continued)

OTHER PUBLICATIONS

The International Search Report mailed Aug. 24, 2020; PCT/CN2020/091621 with English Translation.

Primary Examiner — Noam Reisner
(74) Attorney, Agent, or Firm — Frank Gao, Esq.

(57) ABSTRACT

Embodiments of the disclosure relate to the technical field of gimbal control, and disclose a gimbal control method and apparatus, a control terminal and an aircraft system. The gimbal control method is applicable to a control terminal. A gimbal carries a photographing device. The method includes: acquiring photographing parameter information of the photographing device, where the photographing parameter information includes a field of view of the photographing device and a resolution of a captured image of the photographing device; acquiring image coordinates of a target object in the captured image that is selected by a user; and controlling an attitude of the gimbal according to the photographing parameter information and the image coordinates of the target object, so that the target object is at a preset position in the captured image.

13 Claims, 5 Drawing Sheets

Acquire photographing parameter information of a photographing device, where the photographing parameter information includes a field of view of the photographing device and a resolution of a captured image of the photographing device — S110

Acquire image coordinates of a target object in the captured image that is selected by a user — S120

Control an attitude of a gimbal according to the photographing parameter information and the image coordinates of the target object, so that the target object is at a preset position in the captured image — S130

(51) Int. Cl.
    *G03B 17/56*     (2021.01)
    *G06T 7/70*     (2017.01)
    *G06T 7/80*     (2017.01)
    *G06V 10/22*     (2022.01)
    *H04N 7/18*     (2006.01)
    *H04N 23/66*     (2023.01)

(52) U.S. Cl.
    CPC ............... *G06T 7/70* (2017.01); *G06T 7/80* (2017.01); *G06V 10/235* (2022.01); *H04N 7/183* (2013.01); *H04N 23/66* (2023.01); *G06T 2207/10032* (2013.01); *G06T 2207/20101* (2013.01); *G06V 2201/07* (2022.01)

(56) References Cited

FOREIGN PATENT DOCUMENTS

| CN | 108475075 | A | 8/2018 |
| CN | 108476288 | A | 8/2018 |
| CN | 108549413 | A | 9/2018 |
| CN | 110083180 | A | 8/2019 |
| JP | 2017065467 | A | 4/2017 |

\* cited by examiner

GIMBAL CONTROL METHOD AND APPARATUS, CONTROL TERMINAL AND AIRCRAFT SYSTEM

CROSS-REFERENCE TO RELATED APPLICATIONS

The present application is a continuation of International Application No. PCT/CN2020/091621, filed on May 21, 2020, which claims priority to Chinese Patent Application No. 2019104304850, filed on May 22, 2019, which is incorporated herein by reference in its entirety.

TECHNICAL FIELD

The present application relates to the field of gimbal control, and in particular, to a gimbal control method and apparatus, a control terminal and an aircraft system.

BACKGROUND

With the development of unmanned aerial vehicle (UAV) technologies, the UAV has been widely used in military and civilian fields. The UAV is a new concept device under rapid development, and has the advantages of a small size, a light weight, maneuverability, quick response, unmanned driving and low requirements for the operation. The UAV carries a plurality of types of photographing apparatuses by using a gimbal, such as a camera, a video camera, and the like. In this way, functions such as real-time image transmission and detection of high-risk areas are implemented. Therefore, the UAV is a powerful complement to satellite remote sensing and conventional aerial remote sensing.

The gimbal is a core device to realize the stability augmentation of the captured picture during the aerial photography of the UAV. The active rotation of the motor is used to offset the disturbance subjected to the photographing apparatus in real time and prevent the shaking of the photographing apparatus, thereby ensuring the stability of the captured picture. At present, the gimbal on the market is equipped with angle sensors, such as potentiometers, magnetic encoders, and the like. The main function of the sensor is to acquire the collected measurement information in real time. In this way, the controller of the gimbal can obtain an angle of the motor by using the measurement information, so as to provide necessary angle information of the motor for the stability augmentation control of the gimbal.

During implementation of the disclosure, the inventor found at least the following problems in the related art. In the existing technical solutions, a user inputs the angle parameters of each axis of the gimbal by using an App or a remote control, to control the movement of the gimbal, thereby adjusting the orientation of the camera. However, it is too difficult for the user who is not skilled in the operation to adjust the angle parameters in a short time and obtain an ideal captured picture.

SUMMARY

An objective of embodiments of the disclosure is to provide a gimbal control method and apparatus, a control terminal and an aircraft system, so as to control the rotation of the gimbal. In this way, a designated point selected from a captured picture appears at a preset position of the captured picture, thereby obtaining an ideal captured picture.

In order to resolve the above technical problem, in a first aspect, an embodiment of the disclosure provides a gimbal control method, applicable to a control terminal. The gimbal carries a photographing device, and the method includes: acquiring photographing parameter information of the photographing device, where the photographing parameter information includes a field of view of the photographing device and a resolution of a captured image of the photographing device: acquiring image coordinates of a target object in the captured image that is selected by a user: and controlling an attitude of the gimbal according to the photographing parameter information and image coordinates of the target object, so that the target object is at a preset position in the captured image.

In some embodiments, the acquiring image coordinates of a target object in the captured image that is selected by a user includes: acquiring the image coordinates of the target object by means of a click/tap operation of the user on the control terminal.

In some embodiments, the resolution of the captured image includes an image pixel width and an image pixel height, and the field of view includes a horizontal field of view and a vertical field of view: and the controlling an attitude of the gimbal according to the photographing parameter information and the image coordinates of the target object, so that the target object is at a preset position in the captured image includes: calculating a pitch angle of the gimbal according to the image coordinates of the target object, the image pixel height and the vertical field of view: calculating a yaw angle of the gimbal according to the image coordinates of the target object, the image pixel width and the horizontal field of view: and controlling the attitude of the gimbal according to the pitch angle and the yaw angle, so that the target object is at the preset position in the captured image.

In some embodiments, the calculating a pitch angle of the gimbal according to the image coordinates of the target object, the image pixel height, and the vertical field of view includes:

calculating the pitch angle of the gimbal according to the following formula:

$$\theta_y = \tan^{-1}\left(\frac{\left|y - \frac{H}{2}\right|}{\frac{H}{2}}\tan\left(\frac{\theta_h}{2}\right)\right).$$

$\theta_y$ is the pitch angle of the gimbal, y is an y-axis coordinate of the target object, H is the image pixel height, and $\theta_h$ is the vertical field of view.

In some embodiments, the calculating a yaw angle of the gimbal according to the image coordinates of the target object, the image pixel width, and the horizontal field of view includes:

calculating the yaw angle of the gimbal according to the following formula:

$$\theta_x = \tan^{-1}\left(\frac{\left|x - \frac{W}{2}\right|}{\frac{W}{2}}\tan\left(\frac{\theta_w}{2}\right)\right).$$

$\theta_x$ is the yaw angle of the gimbal, x is an x-axis coordinate of the target object, W is the image pixel width, and $\theta_w$ is the horizontal field of view.

In some embodiments, the preset position is a center of the captured image.

In a second aspect, an embodiment of the disclosure further provides a gimbal control apparatus, applicable to a control terminal. The gimbal carries a photographing device, and the apparatus includes: a first acquisition module, configured to acquire photographing parameter information of the photographing device, where the photographing parameter information includes a field of view of the photographing device and a resolution of a captured image of the photographing device: a second acquisition module, configured to acquire image coordinates of a target object in the captured image that is selected by a user: and a control module, configured to control an attitude of the gimbal according to the photographing parameter information and the image coordinates of the target object, so that the target object is at a preset position in the captured image.

In some embodiments, the second acquisition module is further configured to acquire the image coordinates of the target object by means of a click/tap operation of the user on the control terminal.

In some embodiments, the resolution of the captured image includes an image pixel width and an image pixel height, and the field of view includes a horizontal field of view and a vertical field of view: and the control module includes: a pitch angle calculation unit, configured to calculate a pitch angle of the gimbal according to the image coordinates of the target object, the image pixel height and the vertical field of view; a yaw angle calculation unit, configured to calculate a yaw angle of the gimbal according to the image coordinates of the target object, the image pixel width and the horizontal field of view; and a control unit, configured to control the attitude of the gimbal according to the pitch angle and the yaw angle, so that the target object is at the preset position in the captured image.

In some embodiments, the pitch angle calculation unit is further configured to calculate the pitch angle of the gimbal according to the following formula:

$$\theta_y = \tan^{-1}\left(\frac{\left|y - \frac{H}{2}\right|}{\frac{H}{2}}{\tan\left(\frac{\theta_h}{2}\right)}\right).$$

$\theta_y$ is the pitch angle of the gimbal, y is a y-axis coordinate of the target object, H is the image pixel height, and $\theta_h$ is the vertical field of view.

In some embodiments, the yaw angle calculation unit is further configured to calculate the yaw angle of the gimbal according to the following formula:

$$\theta_x = \tan^{-1}\left(\frac{\left|x - \frac{W}{2}\right|}{\frac{W}{2}}{\tan\left(\frac{\theta_w}{2}\right)}\right).$$

$\theta_x$ is the yaw angle of the gimbal, x is an x-axis coordinate of the target object, W is the image pixel width, and $\theta_w$ is the horizontal field of view.

In some embodiments, the preset position is a center of the captured image.

In a third aspect, an embodiment of the disclosure further provides a control terminal. The control terminal includes: a housing: a display screen, connected to the housing: at least one processor, disposed in the housing: and a memory, communicatively connected to the at least one processor where the processor is configured to: acquire photographing parameter information of the photographing device, where the photographing parameter information includes a field of view of the photographing device and a resolution of a captured image of the photographing device: acquire image coordinates of a target object in the captured image that is selected by a user; and control an attitude of the gimbal according to the photographing parameter information and the image coordinates of the target object, so that the target object is at a preset position in the captured image.

In some embodiments, the processor is further configured to acquire the image coordinates of the target object by means of a click/tap operation of the user on the display screen.

In some embodiments, the resolution of the captured image includes an image pixel width and an image pixel height, and the field of view includes a horizontal field of view and a vertical field of view; and the processor is further configured to: calculate a pitch angle of the gimbal according to the image coordinates of the target object, the image pixel height, and the vertical field of view: calculate a yaw angle of the gimbal according to the image coordinates of the target object, the image pixel width and the horizontal field of view: and control the attitude of the gimbal according to the pitch angle and the yaw angle, so that the target object is at the preset position in the captured image.

In some embodiments, the processor is further configured to calculate the pitch angle of the gimbal according to the following formula:

$$\theta_y = \tan^{-1}\left(\frac{\left|y - \frac{H}{2}\right|}{\frac{H}{2}}{\tan\left(\frac{\theta_h}{2}\right)}\right).$$

$\theta_y$ is the pitch angle of the gimbal, y is a y-axis coordinate, in the image coordinates, of the target object, H is the image pixel height, and $\theta_h$ is the vertical field of view.

In some embodiments, the processor is further configured to calculate the yaw angle of the gimbal according to the following formula:

$$\theta_x = \tan^{-1}\left(\frac{\left|x - \frac{W}{2}\right|}{\frac{W}{2}}{\tan\left(\frac{\theta_w}{2}\right)}\right).$$

$\theta_x$ is the yaw angle of the gimbal, x is an x-axis coordinate, in the image coordinates, of the target object, W is the image pixel width, and $\theta_w$ is the horizontal field of view.

In some embodiments, the preset position is a center of the captured image. In a fourth aspect, an embodiment of the disclosure further provides an aircraft system, including: a UAV, including a fuselage, a gimbal and a photographing device, where the photographing device is mounted to the gimbal, and the gimbal is mounted to the fuselage; and the control terminal communicatively connected to the UAV.

In a fifth aspect, an embodiment of the disclosure further provides a non-volatile computer-readable storage medium, the computer-readable storage medium storing computer executable instructions which, when executed by a control terminal, cause the control terminal to execute the foregoing gimbal control method.

According to the embodiments of the disclosure, the field of view of the photographing device mounted to the gimbal and the resolution of the captured image are acquired. The image coordinates of the target object in the captured image that is selected by the user are acquired. Based on the field of view of the photographing device, the resolution of the captured image and the image coordinates of the target object, the attitude of the gimbal is controlled. In this way, the target object is at the preset position in the captured image, thereby obtaining an ideal captured picture and improving user experience.

BRIEF DESCRIPTION OF THE DRAWINGS

To describe the technical solutions in the embodiments of the disclosure more clearly, the following briefly introduces the accompanying drawings required for describing the embodiments of the disclosure. Apparently, the accompanying drawings described below are merely some embodiments of the disclosure, and a person of ordinary skill in the art may further obtain other accompanying drawings according to the accompanying drawings without creative efforts.

DETAILED DESCRIPTION

Figure 1:
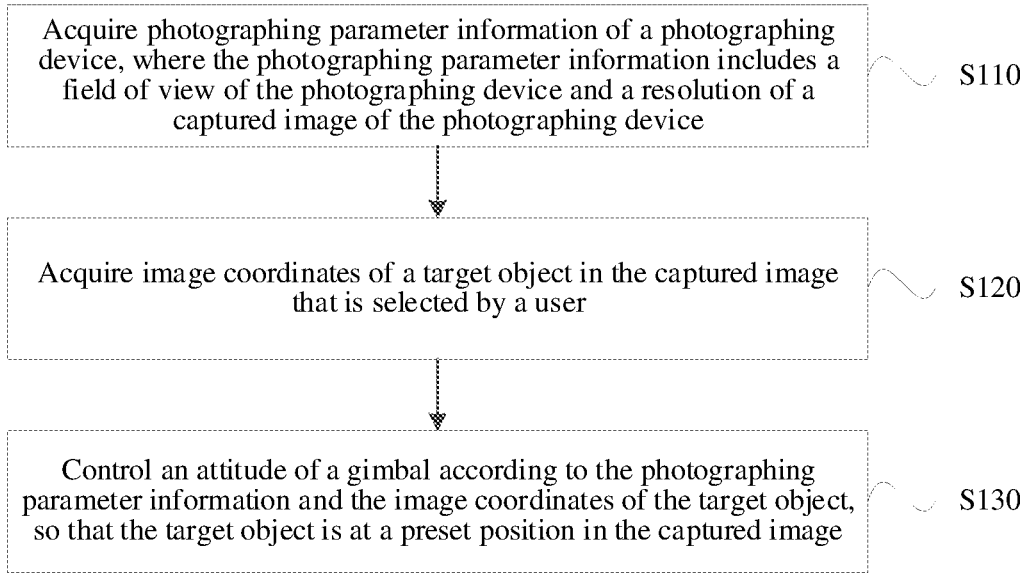
FIG. 1 is a schematic flowchart of a gimbal control method according to an embodiment of the disclosure.

To make the objectives, technical solutions, and advantages of the present application clearer, the following further describes the disclosure in detail with reference to the accompanying drawings and the embodiments. It should be understood that the specific embodiments described herein are merely used to explain the disclosure but are not intended to limit the disclosure.

It should be noted that, if no conflict occurs, features in the embodiments of the disclosure may be combined with each other and fall within the protection scope of the disclosure. In addition, although functional module division is performed in the schematic diagram of the apparatus, and a logical sequence is shown in the flowchart, in some cases, the shown or described steps may be performed by using module division different from the module division in the apparatus, or in a sequence different from the sequence in the flowchart. Further, terms such as "first", "second", or the like used in the disclosure do not limit data or an execution order, but are only used to distinguish the same objects or similar objects whose functions and purposes are basically the same.

The gimbal control method and apparatus provided in the embodiments of the disclosure may be applied to various terminals or aircraft systems. For example, a terminal is connected to an aircraft. The aircraft, such as a UAV, is equipped with a gimbal and a photographing device. The gimbal may carry a photographing device and is mounted to a fuselage of the UAV for aerial photography.

Detailed descriptions are given below by using the UAV as an example.

The terminal is connected to the UAV.

The UAV includes a fuselage, a gimbal and a photographing device. The photographing device is mounted to the gimbal, and the gimbal is mounted to the fuselage.

The fuselage includes a central housing and one or more arms connected to the central housing. The one or more arms extend radially from the central housing. The arms may be integrally or fixedly connected to the central housing.

The gimbal is configured to carry the photographing device, so as to fix the photographing device or randomly adjust an attitude of the photographing device (for example, change a height, a tilt angle and/or a direction of the photographing device) and stably maintaining the photographing device at a set attitude. For example, during the aerial photography of the UAV, the gimbal is mainly used to stabilize the photographing device at the set attitude, so as to prevent a captured picture of the photographing device from shaking and ensure the stability of the captured picture. The gimbal is connected to the terminal, so as to adjust the attitude under the control of the terminal.

The gimbal may include a base, a motor and a gimbal controller. The motor is mounted to the base. The gimbal controller is connected to the motor, is configured to control the motor, and is connected to the terminal. Specifically, the terminal is configured to perform the above gimbal control method to obtain a gimbal attitude (for example, a pitch angle, a yaw angle, a roll angle), generate a control instruction according to the gimbal attitude, and transmit the control instruction to the gimbal controller of the gimbal. The gimbal controller controls the motor by using the control instruction. The gimbal controller is configured to perform the above gimbal control method to obtain a gimbal attitude, generate a control instruction according to the gimbal attitude, and control the motor by using the control instruction.

The base is connected to the fuselage of the UAV to fixedly mount the photographing device to the fuselage of the UAV. The motor is respectively connected to the base and the photographing device. The gimbal may be a multi-axis gimbal, and accordingly, there are a plurality of motors. That is to say, one motor is disposed on each axis. On the one hand, the motor can drive the rotation of the photographing apparatus, so as to meet the adjustment of the horizontal rotation and the pitch angle of the rotary shaft for photography. The motor can be rotated manually by means of remote control or the program can be used to cause the motor to automatically rotate, so as to achieve the function of omni-directional scanning and monitoring. On the other hand, during the aerial photography of the UAV, the rotation of the motor is used to offset the disturbance subjected to the photographing device in real time and prevent the shaking of the photographing device, thereby ensuring the stability of the captured picture. The gimbal controller is a device having a certain logic processing capability, such as a control chip, a single-chip microcomputer, a microcontroller unit (MCU) and the like.

The photographing device may be an image collection device for collecting images. The photographing device includes but is not limited to: a camera, a video camera, a webcam, a scanner, a camera phone and the like. The photographing device is configured to acquire aerial images during the flight of the UAV.

During the gimbal control, it is usually necessary to control the movement of the gimbal based on angle parameters of each axis of the gimbal. However, in the existing technical solutions, a user inputs the angle parameters of each axis of the gimbal by using an App or a remote control, to control the movement of the gimbal, thereby adjusting the orientation of the camera. However, it is too difficult for the user who is not skilled in the operation to adjust the angle parameters in a short time and obtain an ideal captured picture.

Therefore, based on the above technical problems, an objective of embodiments of the disclosure is to provide a gimbal control method and apparatus, a control terminal and an aircraft system, so as to control the rotation of the gimbal. In this way, a designated point selected from a captured picture appears at a preset position of the captured picture, thereby obtaining an ideal captured picture.

According to the embodiments of the disclosure, the field of view of the photographing device mounted to the gimbal and the resolution of the captured image are acquired. The image coordinates of the target object in the captured image that is selected by the user are acquired. Based on the field of view of the photographing device, the resolution of the captured image and the image coordinates of the target object, the attitude of the gimbal is controlled. In this way, the target object is at the preset position in the captured image, thereby obtaining an ideal captured picture and improving user experience.

The embodiments of the disclosure are further described below with reference to the accompanying drawings.

Embodiment 1

FIG. 1 is a schematic flowchart of a gimbal control method according to an embodiment of the disclosure. The gimbal control method may be performed by various controllers having certain logic processing capabilities, such as a terminal and the like. The gimbal control method is performed by a control terminal by way of example, and the aircraft is a UAV by way of example for description. The UAV includes a fuselage, a gimbal and a photographing device mounted to the gimbal. The gimbal is mounted to the fuselage. The gimbal includes a base, a motor and a gimbal controller. The control terminal is connected to the gimbal controller, the gimbal controller is connected to the motor, and the photographing device is connected to the base by using the motor. The gimbal may be a multi-axis gimbal, such as a two-axis gimbal and a three-axis gimbal. The three-axis gimbal is used as an example below for description.

Referring to FIG. 1, the gimbal control method includes the following steps.

S110: Acquire photographing parameter information of a photographing device. The photographing parameter information includes a field of view of the photographing device and a resolution of a captured image of the photographing device.

Figure 2A:
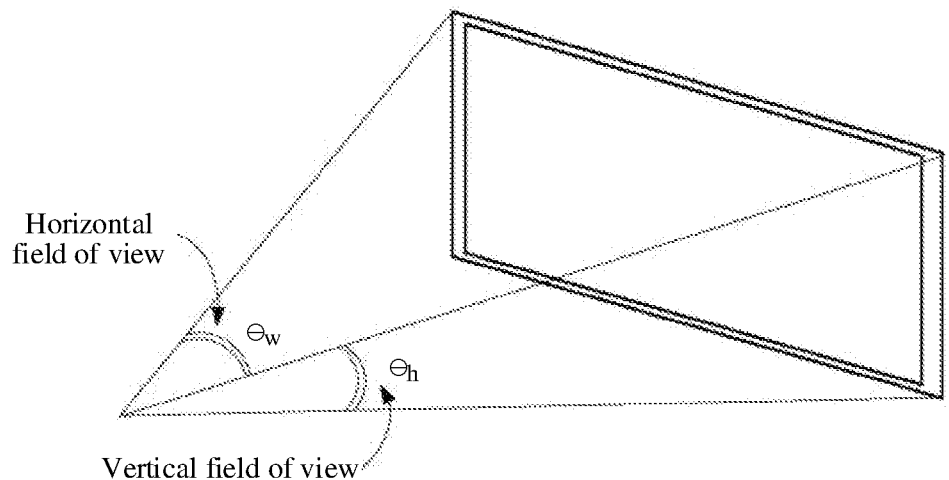
FIG. 2a is a schematic diagram of a field of view of a photographing device according to an embodiment of the disclosure.
Figure 2B:
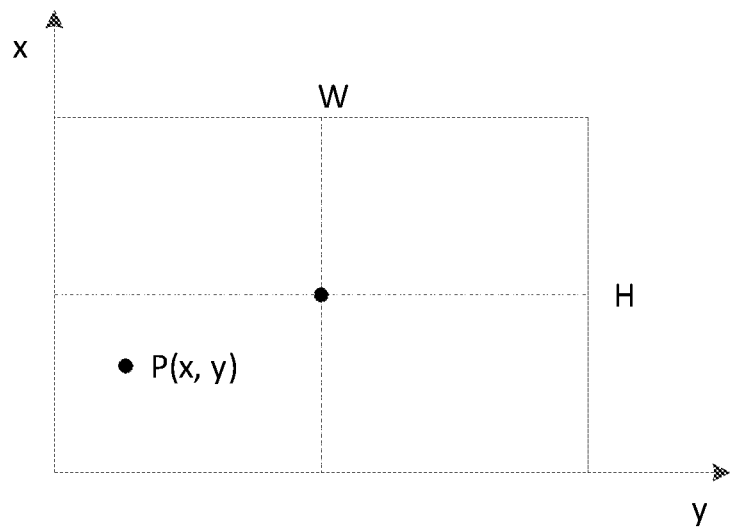
FIG. 2b is a schematic diagram of position coordinates between a photographing device and a target object according to an embodiment of the disclosure.

In this embodiment, the "photographing parameter information" refers to parameter information acquired when the photographing device photographs a captured object. The captured object refers to all objects currently photographed by the photographing device. The photographing parameter information includes the field of view of the photographing device and the resolution of the captured image of the photographing device. The field of view refers to an included angle formed by two edges in the maximum range in which the captured object can pass through the lens by using the lens of the photographing device as a vertex. In this embodiment, the field of view includes a horizontal field of view and a vertical field of view. The horizontal field of view is an included angle formed by two edges in a vertical direction in the maximum range in which the captured object can pass through the lens by using the lens of the photographing device as a vertex. The vertical field of view is an included angle formed by two edges in a horizontal direction in the maximum range in which the captured object can pass through the lens by using the lens of the photographing device as a vertex. FIG. 2a shows the horizontal field of view $\theta_w$ of the photographing device and the vertical field of view $\theta_h$ of the photographing device. The "resolution of the captured image" is a resolution of an image captured by the photographing device. As shown in FIG. 2b, the resolution of the captured image includes an image pixel width W and an image pixel height H. The image pixel width W is an imaging width of the captured object on a CCD target surface of the photographing device. The image pixel height H is an imaging height of the captured object on the CCD target surface of the photographing device. The specification size of the CCD target surface is in millimeters.

In this embodiment, the acquiring photographing parameter information of a photographing device specifically includes: acquiring, by a terminal, the photographing parameter information of the photographing device in real time. The terminal may be connected to the photographing device. The terminal reads the photographing parameter information of the photographing device in real time. Alternatively, the terminal is connected to the gimbal controller. The gimbal controller is connected to the photographing device. The photographing parameter information of the photographing device is read in real time by using the gimbal controller. For example, the terminal reads a focal length of the photographing device and the image pixel width W and the image pixel height H of the captured image in real time, and calculates the horizontal field of view $\theta_w$ of the photographing device and the vertical field of view $\theta_h$ of the photographing device according to the focal length of the photographing device and the image pixel width W and the image pixel height H of the captured image. In this way, the photographing parameter information of the photographing device is acquired in real time S120: Acquire image coordinates of a target object in the captured image that is selected by a user.

In this embodiment, the "target object" is a target point in the captured image captured by the photographing device that is selected by the user, and the "image coordinates of the target object" represent a position of the target point in the captured image. For example, the captured image captured by the photographing device is displayed on the screen of the terminal. The user watches the captured image on the screen of the terminal and selects a point in the captured image on the screen as the target point. Then an object corresponding to the target point is the target object. The position of the target point in the captured image is the image coordinates of the target object.

Figure 3:
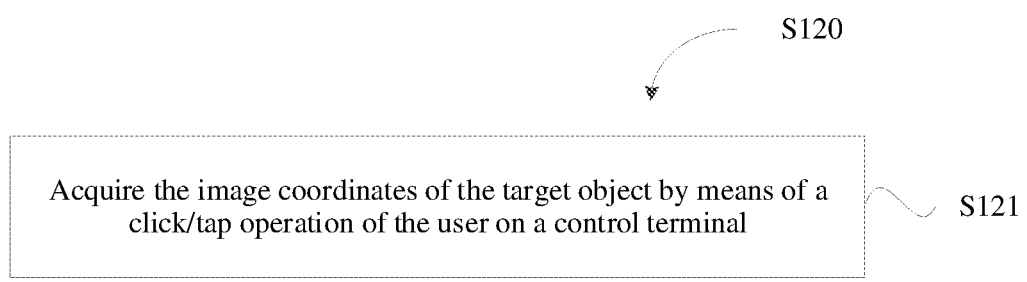
FIG. 3 is a schematic flowchart of S120 in FIG. 1.

As shown in FIG. 3, S120 may include the following step.

S121: Acquire the image coordinates of the target object by means of a click/tap operation of the user on a control terminal.

The user may select the target point in a variety of ways. In this embodiment, the image coordinates of the target object may be acquired by acquiring the click/tap operation of the user on the control terminal. The acquiring the image coordinates of the target object may specifically include: establishing a coordinate system in the captured image: and acquiring coordinate information of the target object in the coordinate system, and using the coordinate information as the image coordinates of the target object. The establishing a coordinate system in the captured image specifically includes: establishing, by using one of vertices of the captured image as the origin, a direction of the image pixel width W of the captured image as an axis x, and a direction of the image pixel height H of the captured image as an axis y, a planar rectangular coordinate system to acquire the coordinate information of the target object in the coordinate system, and using the coordinate information as the image coordinates of the target object. For example, as shown in FIG. 2b, a coordinate system xoy is established, and the target object is P. The coordinate information of the target object P can be obtained from the coordinate system as (x, y), and then (x, y) is the image coordinates of the target object P.

It should be noted that S110 and S120 may be performed simultaneously, or may be performed step by step. For example, S110 is first performed, and then S120 is performed. Alternatively, S120 is first performed, and then S110 is performed.

S130: Control an attitude of a gimbal according to the photographing parameter information and the image coordinates of the target object, so that the target object is at a preset position in the captured image.

The "preset position" may be a position at which the user wants the target object to appear in the captured image that is preset in advance. In this embodiment, the preset position is the center of the captured image. For example, assuming that the target object in the acquired captured image is in the upper left of the captured image, the target object is located in the center of the captured image after the attitude of the gimbal is adjusted.

Figure 4:
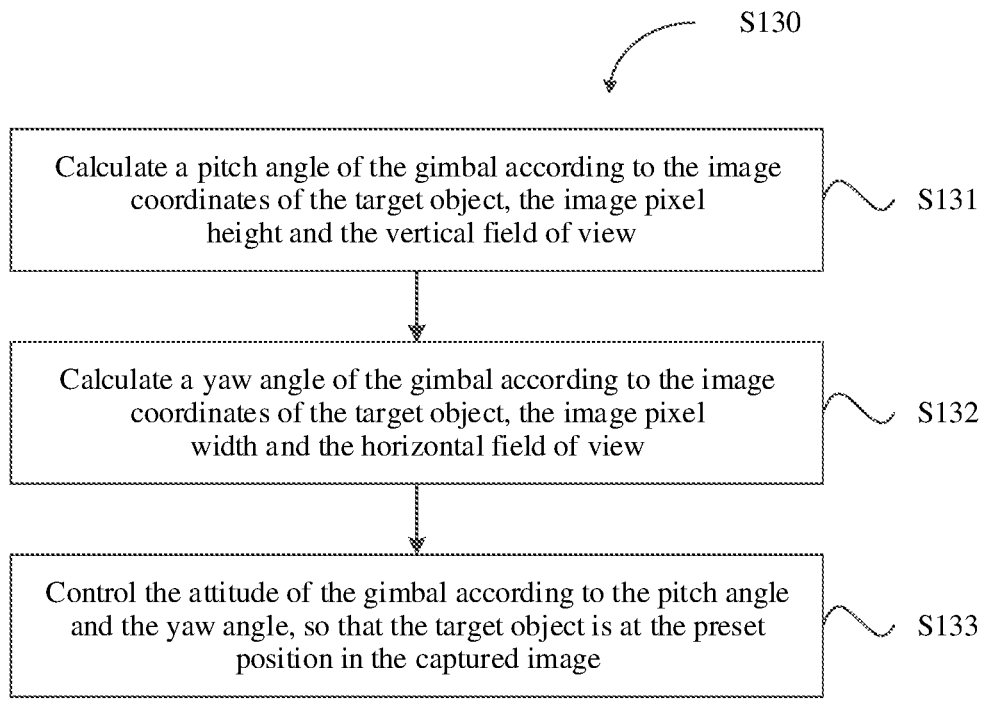
FIG. 4 is a schematic flowchart of S130 in FIG. 1.

As shown in FIG. 4, S130 may include the following steps.

S131: Calculate a pitch angle of the gimbal according to the image coordinates of the target object, the image pixel height and the vertical field of view.

S132: Calculate a yaw angle of the gimbal according to the image coordinates of the target object, the image pixel width and the horizontal field of view.

S133: Control the attitude of the gimbal according to the pitch angle and the yaw angle, so that the target object is at the preset position in the captured image.

The pitch angle of the gimbal is an angle by which the gimbal needs to rotate on the pitch axis, and the yaw angle of the gimbal is an angle by which the gimbal needs to rotate on the yaw axis.

Figure 5A:
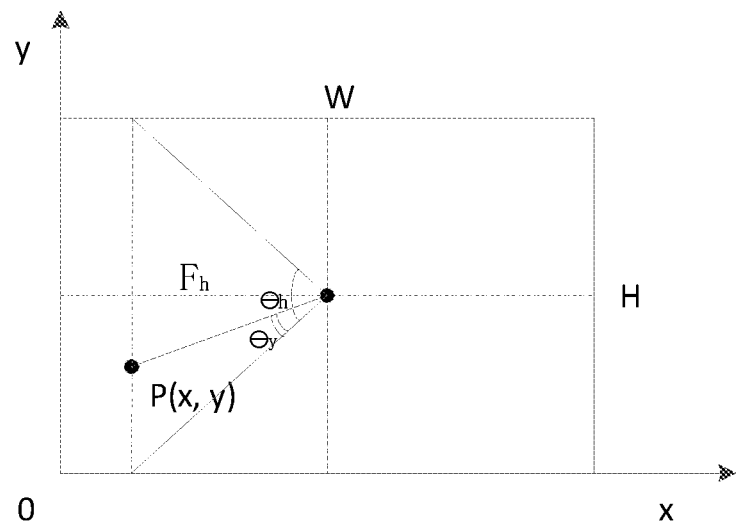
FIG. 5a and FIG. 5b are schematic diagrams showing establishment of a coordinate system of a captured image.

In S131, referring to FIG. 5a together, (x, y) is the image coordinates of the target object P, y is a y-axis coordinate, in the image coordinates, of the target object, H is the image pixel height of the captured image, $\theta_h$ is the vertical field of view of the photographing device, and $\theta_y$ is the pitch angle of the gimbal. The following formula can be obtained according to the geometric relationship:

$$\tan\left(\frac{\theta_h}{2}\right) = \frac{\frac{H}{2}}{F_h}.$$

That is $$F_h = \frac{\frac{H}{2}}{\tan\left(\frac{\theta_h}{2}\right)}.$$

$F_h$ is a distance from a vertex of the vertical field of view of the photographing device to the captured object in the y-axis direction.

For any P (x, y) in the captured image, the following formula can be obtained according to the geometric relationship:

$$\tan\theta_y = \frac{\left|y - \frac{H}{2}\right|}{F_h}.$$

That is $$\theta_y = \tan^{-1}\left(\frac{\left|y - \frac{H}{2}\right|}{F_h}\right).$$

$F_h$ is substituted into the formula, the pitch angle of the gimbal is obtained as follows:

$$\theta_y = \tan^{-1}\left(\frac{\left|y - \frac{H}{2}\right|}{\frac{\frac{H}{2}}{\tan\left(\frac{\theta_h}{2}\right)}}\right).$$

Figure 5B:
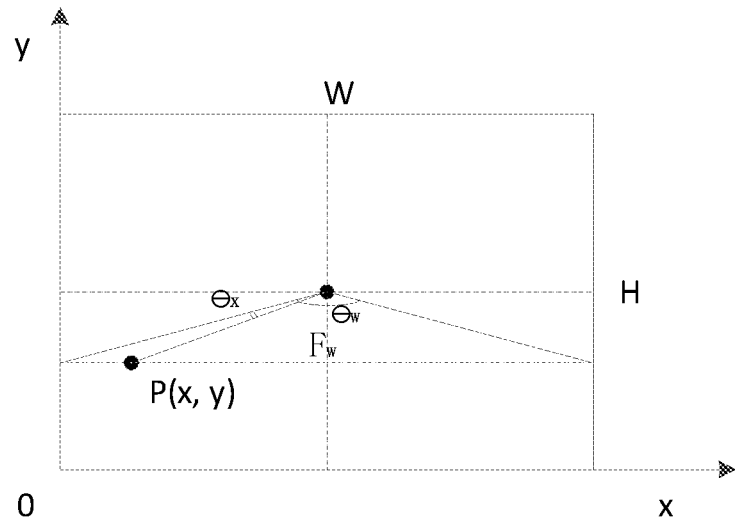

In S132, referring to FIG. 5b together, (x, y) is the image coordinates of the target object P, x is an x-axis coordinate, in the image coordinates, of the target object, W is the image pixel width of the captured image, $\theta_w$ is the horizontal field of view of the photographing device, and $\theta_x$ is the pitch angle of the gimbal. The following formula can be obtained according to the geometric relationship:

$$\tan\left(\frac{\theta_w}{2}\right) = \frac{\frac{W}{2}}{F_w}.$$

That is $$F_w = \frac{\frac{H}{2}}{\tan\left(\frac{\theta_w}{2}\right)}.$$

$F_w$ is a distance from a vertex of the horizontal field of view of the photographing device to the captured object in the x-axis direction.

For any P (x, y) in the captured image, the following formula can be obtained according to the geometric relationship:

$$\tan\theta_x = \frac{\left|x - \frac{W}{2}\right|}{F_w}.$$

That is $$\theta_x = \tan^{-1}\left(\frac{\left|x - \frac{W}{2}\right|}{F_w}\right).$$

$F_w$ is substituted into the formula, the yaw angle of the gimbal is obtained as follows:

$$\theta_x = \tan^{-1}\left(\frac{\left|x - \frac{W}{2}\right|}{\frac{\frac{W}{2}}{\tan\left(\frac{\theta_w}{2}\right)}}\right).$$

In S133, according to the pitch angle and the yaw angle, the attitude of the gimbal is controlled. The specific implementation may be as follows. After the pitch angle and the yaw angle are calculated, the terminal generates a control instruction according to the pitch angle and the yaw angle, and transmits the control instruction to the gimbal controller. In this way, the gimbal controller controls the motor to rotate to control the attitude adjustment of the gimbal, so that the target object appears in the center of the captured image. The terminal may first control the gimbal adjustment according to the pitch angle, and then control the gimbal adjustment according to the yaw angle. Alternatively, the terminal may first control the gimbal adjustment according to the yaw angle, and then control the gimbal adjustment according to the pitch angle, and may further control the gimbal adjustment simultaneously according to the pitch angle and the yaw angle.

In this embodiment, according to the gimbal control method, the field of view of the photographing device mounted to the gimbal and the resolution of the captured image are acquired, and the image coordinates of the target object in the captured image that is selected by the user are acquired. Based on the field of view of the photographing device, the resolution of the captured image and the image coordinates of the target object, the attitude of the gimbal is controlled. In this way, the target object is at the preset position in the captured image, thereby obtaining an ideal captured picture and improving user experience.

Embodiment 2

Figure 6:
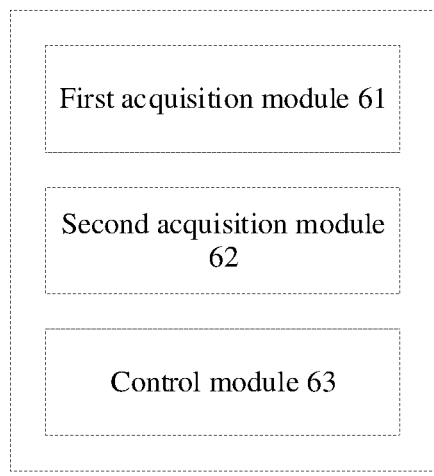
FIG. 6 is a schematic structural diagram of a gimbal control apparatus according to an embodiment of the disclosure.

FIG. 6 is a schematic structural diagram of a gimbal control apparatus according to an embodiment of the disclosure. A gimbal control apparatus 60 may be configured in various controllers having certain logic processing capabilities, such as a terminal and the like. The gimbal control method is performed by a control terminal by way of example, and the aircraft is a UAV by way of example for description. The UAV includes a fuselage, a gimbal and a photographing device mounted to the gimbal. The gimbal is mounted to the fuselage. The gimbal includes a base, a motor and a gimbal controller. The control terminal is connected to the gimbal controller, the gimbal controller is connected to the motor, and the photographing device is connected to the base by using the motor. The gimbal may be a multi-axis gimbal, such as a two-axis gimbal and a three-axis gimbal. The three-axis gimbal is used as an example below for description.

Referring to FIG. 6, the gimbal control apparatus 60 includes a first acquisition module 61, a second acquisition module 62 and a control module 63.

The first acquisition module 61 and the second acquisition module 62 each are connected to the control module 63. The first acquisition module 61 is configured to acquire photographing parameter information of a photographing device. The photographing parameter information includes a field of view of the photographing device and a resolution of a captured image of the photographing device. The second acquisition module 62 is configured to acquire image coordinates of a target object in the captured image that is selected by a user. The control module 63 is configured to control an attitude of the gimbal according to the photographing parameter information and the image coordinates of the target object, so that the target object is at a preset position in the captured image.

The second acquisition module 62 includes a coordinate acquisition unit. The coordinate acquisition unit is configured to acquire the image coordinates of the target object by means of a click/tap operation of the user on the control terminal.

The resolution of the captured image includes an image pixel width and an image pixel height. The field of view includes a horizontal field of view and a vertical field of view. The control module 63 includes a pitch angle calculation unit, a yaw angle calculation unit and a control unit. The pitch angle calculation unit is configured to calculate a pitch angle of the gimbal according to the image coordinates of the target object, the image pixel height and the vertical field of view. The yaw angle calculation unit is configured to calculate a yaw angle of the gimbal according to the image coordinates of the target object, the image pixel width and the horizontal field of view. The control unit is configured to control the attitude of the gimbal according to the pitch angle and the yaw angle.

The pitch angle calculation unit is further configured to calculate the pitch angle according to the following formula:

$$\theta_y = \tan^{-1}\left(\frac{\left|y - \frac{H}{2}\right|}{\frac{\frac{H}{2}}{\tan\left(\frac{\theta_h}{2}\right)}}\right).$$

$\theta_y$ is the pitch angle of the gimbal, y is the y-axis coordinate of the target object, H is the image pixel height, and $\theta_h$ is the vertical field of view.

The yaw angle calculation unit is further configured to calculate the yaw angle of the gimbal according to the following formula:

$$\theta_x = \tan^{-1}\left(\frac{\left|x - \frac{W}{2}\right|}{\frac{\frac{W}{2}}{\tan\left(\frac{\theta_w}{2}\right)}}\right).$$

$\theta_x$ is the yaw angle of the gimbal, x is the x-axis coordinate of the target object, W is the image pixel width, and $\theta_w$ is the horizontal field of view.

The preset position is a center of the captured image.

In this embodiment, according to the gimbal control apparatus 60, the first acquisition module 61 acquires the field of view of the photographing device mounted to the gimbal and the resolution of the captured image. The second acquisition module 62 acquires the image coordinates of the target object in the captured image that is selected by the user. The control module 63 controls the attitude of the gimbal based on the field of view of the photographing device, the resolution of the captured image and the image coordinates of the target object. In this way, the target object is at the preset position in the captured image, thereby obtaining an ideal captured picture and improving user experience.

Embodiment 3

Figure 7:
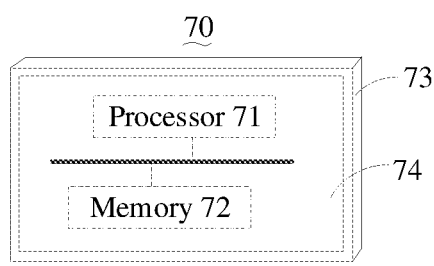
FIG. 7 is a schematic structural diagram of a control terminal according to an embodiment of the disclosure.

FIG. 7 is a schematic structural diagram of a control terminal according to an embodiment of the disclosure. As shown in FIG. 7, a control terminal 70 includes one or more processors 71 and a memory 72 (one processor 71 used as an example in FIG. 7), a housing 73 and a display screen 74 connected to the housing. The processor 71 is disposed in the housing. The processor 71 and the memory 72 may be connected by using a bus or in other manners. In FIG. 7, the processor is connected to the memory by using the bus by way of example.

The memory 72, as a non-volatile computer readable storage medium, may be configured to store a non-volatile software program, a non-volatile computer executable program, and a module, such as a program instruction/unit corresponding to the gimbal control method in the embodiments of the disclosure (for example, the first acquisition module 61, the second acquisition module 62 and the control module 63 shown in FIG. 6). The processor 71 executes various function applications and data processing of the gimbal by running the non-volatile software program, the instruction and the unit stored in the memory 72. That is to say, the gimbal control method in the foregoing method embodiment is performed.

The memory 72 may include a program storage area and a data storage area. The program storage area may store an operating system and an application program required for at least one function. The data storage area may store data and the like created according to use of a UAV. In addition, the memory 72 may include a high-speed random access memory, and may further include a non-volatile memory, such as at least one magnetic disk memory device, a flash memory device, or other non-volatile solid-state memory devices. In some embodiments, the memory 72 optionally includes memories remotely disposed relative to the processor 71. These remote memories may be connected to the UAV via a network. An example of the foregoing network includes, but is not limited to, the Internet, an intranet, a local area network, a mobile communication network and a combination thereof.

The one or more units are stored in the memory 72. When executed by the one or more processors 71, the gimbal control method in any of the foregoing method embodiments is performed. For example, S110-S130 of the method in FIG. 1 described above are performed, to implement functions of the modules 61-63 shown in FIG. 6.

In this embodiment, the processor 71 is configured to: acquire photographing parameter information of a photographing device, where the photographing parameter information includes a field of view of the photographing device and a resolution of a captured image of the photographing device: acquire image coordinates of a target object in the captured image that is selected by a user: and control an attitude of the gimbal according to the photographing parameter information and the image coordinates of the target object, so that the target object is at a preset position in the captured image.

The processor 71 is further configured to acquire the image coordinates of the target object by means of a click/tap operation of the user on the display screen. The resolution of the captured image includes an image pixel width and an image pixel height. The field of view includes a horizontal field of view and a vertical field of view.

The processor 71 is further configured to: calculate a pitch angle of the gimbal according to the image coordinates of the target object, the image pixel height and the vertical field of view: calculate a yaw angle of the gimbal according to the image coordinates of the target object, the image pixel width and the horizontal field of view; and control the attitude of the gimbal according to the pitch angle and the yaw angle, so that the target object is at the preset position in the captured image.

The processor 71 is further configured to calculate the pitch angle of the gimbal according to the following formula:

$$\theta_y = \tan^{-1}\left(\frac{\left|y - \frac{H}{2}\right|}{\frac{\frac{H}{2}}{\tan\left(\frac{\theta_h}{2}\right)}}\right).$$

$\theta_y$ is the pitch angle of the gimbal, y is the y-axis coordinate, in the image coordinates, of the target object, H is the image pixel height, and $\theta_h$ is the vertical field of view.

The processor 71 is further configured to calculate the yaw angle of the gimbal according to the following formula:

$$\theta_x = \tan^{-1}\left(\frac{\left|x - \frac{W}{2}\right|}{\frac{\frac{W}{2}}{\tan\left(\frac{\theta_w}{2}\right)}}\right).$$

$\theta_x$ is the yaw angle of the gimbal, x is the x-axis coordinate, in the image coordinates, of the target object, W is the image pixel width, and $\theta_w$ is the horizontal field of view.

The preset position is a center of the captured image.

The above terminal can perform the gimbal control method provided in the embodiments of the present application, and has the corresponding functional modules for performing the method and beneficial effects. For technical details not described in detail in the terminal embodiment, reference may be made to the method provided in the embodiment of the disclosure.

An embodiment of the disclosure further provides a non-volatile computer-readable storage medium storing computer-executable instructions. The computer-executable instructions are executed by one or more processors, for example, the processor 71 in FIG. 7. In this way, the one or more processors can perform the gimbal control method in any of the foregoing method embodiments. For example, steps S110-S130 in the foregoing method in FIG. 1 are performed, to implement functions of the modules 61-63 shown in FIG. 6.

Embodiment 4

Figure 8:
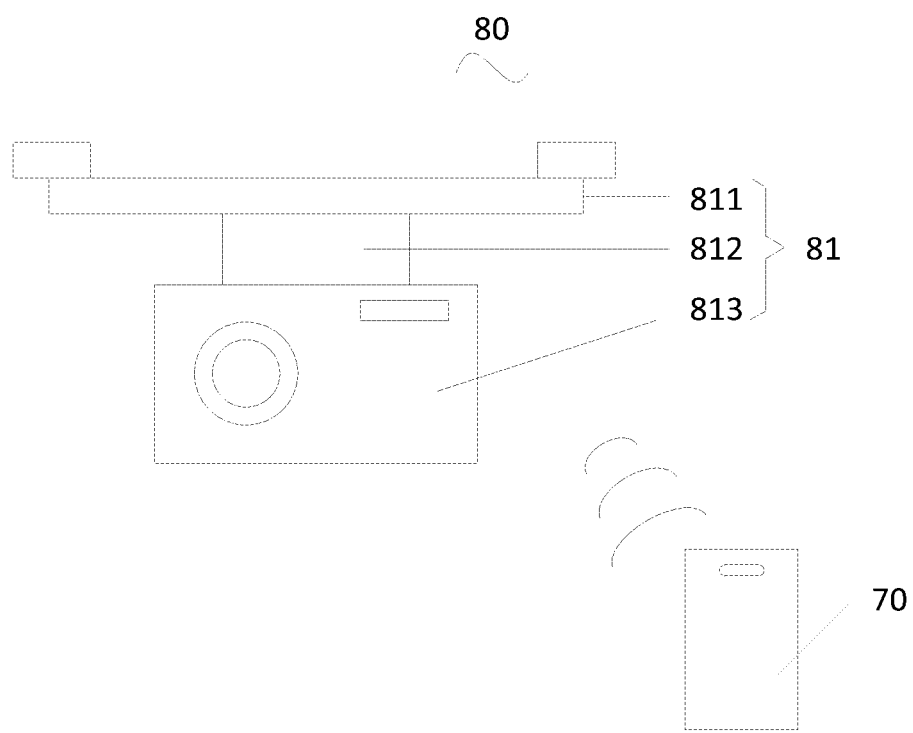
FIG. 8 is a schematic diagram of an aircraft system according to an embodiment of the disclosure.

FIG. 8 is a schematic diagram of an aircraft system according to an embodiment of the disclosure. As shown in FIG. 8, an aircraft system 80 includes a UAV 81 and a control terminal 70. The control terminal 70 is connected to the UAV 81. The control terminal 70 is the same as the terminal 70 in Embodiment 3, and details will not be described herein again.

The UAV 81 includes:
a fuselage 811;
a gimbal 812, mounted to the fuselage 811 and connected to the control terminal 70; and
a photographing device 813, mounted to the gimbal 812.

The gimbal 812 may include a base, a motor and a gimbal controller. The control terminal 70 is connected to the gimbal controller. The gimbal controller is connected to the motor. The photographing device 813 is connected to the base by using the motor.

Finally, it should be noted that: The foregoing embodiments are merely used for describing the technical solutions of the disclosure, but are not intended to limit the disclosure. Under the ideas of the disclosure, the technical features in the foregoing embodiments or different embodiments may also be combined, the steps may be performed in any order, and many other changes of different aspects of the present invention also exists as described above, and these changes are not provided in detail for simplicity. Although the disclosure is described in detail with reference to the foregoing embodiments, it should be appreciated by a person skilled in the art that modifications may still be made to the technical solutions described in the foregoing embodiments, or equivalent replacements may be made to the part of the technical features; and these modifications or replacements will not cause the essence of corresponding technical solutions to depart from the scope of the technical solutions in the embodiments of the disclosure.

What is claimed is:

1. A gimbal control method, applicable to a control terminal, wherein
the gimbal carries a photographing device, the method comprising:
acquiring photographing parameter information of the photographing device, wherein the photographing parameter information comprises a field of view of the photographing device and a resolution of a captured image of the photographing device;
acquiring image coordinates of a target object in the captured image that is selected by a user; and
controlling an attitude of the gimbal according to the photographing parameter information and the image coordinates of the target object, so that the target object is at a preset position in the captured image;
wherein the resolution of the captured image comprises an image pixel width and an image pixel height, and the field of view comprises a horizontal field of view and a vertical field of view; and
the controlling an attitude of the gimbal according to the photographing parameter information and the image coordinates of the target object, so that the target object is at a preset position in the captured image comprises:
calculating a pitch angle of the gimbal according to the image coordinates of the target object, the image pixel height and the vertical field of view;
calculating a yaw angle of the gimbal according to the image coordinates of the target object, the image pixel width and the horizontal field of view; and
controlling the attitude of the gimbal according to the pitch angle and the yaw angle, so that the target object is at the present position in the captured image;
wherein the calculating a pitch angle of the gimbal according to the image coordinates of the target object, the image pixel height, and the vertical field of view comprises:
calculating the pitch angle according to the following formula:

$$\theta_y = \tan^{-1}\left(\frac{\left|y-\frac{H}{2}\right|}{\frac{H}{2}{\tan\left(\frac{\theta_h}{2}\right)}}\right),$$

wherein
$\theta_y$ is the pitch angle of the gimbal, y is a y-axis coordinate, in the image coordinates, of the target object, H is the image pixel height, and $\theta_h$ is the vertical field of view.

2. The gimbal control method according to claim 1, wherein the acquiring image coordinates of a target object in the captured image that is selected by a user comprises:
acquiring the image coordinates of the target object by means of a click/tap operation of the user on the control terminal.

3. The gimbal control method according to claim 1, wherein the calculating a yaw angle of the gimbal according to the image coordinates of the target object, the image pixel width, and the horizontal field of view comprises:
calculating the yaw angle of the gimbal according to the following formula:

$$\theta_x = \tan^{-1}\left(\frac{\left|x-\frac{W}{2}\right|}{\frac{W}{2}{\tan\left(\frac{\theta_w}{2}\right)}}\right),$$

wherein $\theta_x$ is the yaw angle of the gimbal, x is an x-axis coordinate, in the image coordinates of the target object, W is the image pixel width, and $\theta_w$ is the horizontal field of view.

4. The gimbal control method according to claim 1, wherein the preset position is a center of the captured image.

5. A gimbal control apparatus, applicable to a control terminal, wherein a gimbal carries a photographing device, the apparatus comprising:

at least one processor; and a memory communicatively connected to the at least one processor, wherein the memory stores instructions executable by the at least one processor, the instructions being executed by the at least one processor to cause the at least one processor to:

acquire photographing parameter information of the photographing device, wherein the photographing parameter information comprises a field of view of the photographing device and a resolution of a captured image of the photographing device;

acquire image coordinates of a target object in the captured image that is selected by a user; and control an attitude of the gimbal according to the photographing parameter information and the image coordinates of the target object, so that the target object is at a preset position in the captured image;

wherein the resolution of the captured image comprises an image pixel width and an image pixel height, and the field of view comprises a horizontal field of view and a vertical field of view;

the processor is further configured to:

calculate a pitch angle of the gimbal according to the image coordinates of the target object, the image pixel height and the vertical field of view;

calculate a yaw angle of the gimbal according to the image coordinates of the target object the image pixel width and the horizontal field of view; and control the attitude of the gimbal according to the pitch angle and the yaw angle, so that the target object is at the preset position in the captured image;

wherein the processor is further configured to calculate the pitch angle of the gimbal according to the following formula:

$$\theta_y = \tan^{-1}\left(\frac{\left|y - \frac{H}{2}\right|}{\frac{H}{2}} \middle/ \tan\left(\frac{\theta_h}{2}\right)\right),$$

wherein $\theta_y$ is the pitch angle of the gimbal, y is a y-axis coordinate of the target object, H is the image pixel height and $\theta_h$ is the vertical field of view.

6. The apparatus according to claim 5, wherein the processor is further configured to acquire the image coordinates of the target object by means of a click/tap operation of the user on the control terminal.

7. The apparatus according to claim 5, wherein the processor is further configured to calculate the yaw angle of the gimbal according to the following formula:

$$\theta_x = \tan^{-1}\left(\frac{\left|x - \frac{W}{2}\right|}{\frac{W}{2}} \middle/ \tan\left(\frac{\theta_w}{2}\right)\right),$$

wherein $\theta_x$ is the yaw angle of the gimbal, x is an x-axis coordinate of the target object, W is the image pixel width, and $\theta_w$ is the horizontal field of view.

8. The apparatus according to claim 5, wherein the preset position is a center of the captured image.

9. A control terminal for controlling a gimbal, wherein the gimbal carries a photographing device, the control terminal comprising:

a housing;

a display screen, connected to the housing;

at least one processor, disposed in the housing; and a memory, communicatively connected to the at least one processor, wherein the processor is configured to:

acquire photographing parameter information of the photographing device, wherein the photographing parameter information comprises a field of view of the photographing device and a resolution of a captured image of the photographing device;

acquire image coordinates of a target object in the captured image that is selected by a user; and control an attitude of the gimbal according to the photographing parameter information and the image coordinates of the target object, so that the target object is at a preset position in the captured image;

wherein the resolution of the captured image comprises an image pixel width and an image pixel height, and the field of view comprises a horizontal field of view and a vertical field of view; and the processor is further configured to:

calculate a pitch angle of the gimbal according to the image coordinates of the target object, the image pixel height and the vertical field of view;

calculate a yaw angle of the gimbal according to the image coordinates of the target object, the image pixel width and the horizontal field of view; and control the attitude of the gimbal according to the pitch angle and the yaw angle so that the target object is at the preset position in the captured image;

wherein the processor is further configured to calculate the pitch angle of the gimbal according to the following formula:

$$\theta_y = \tan^{-1}\left(\frac{\left|y - \frac{H}{2}\right|}{\frac{H}{2}} \middle/ \tan\left(\frac{\theta_h}{2}\right)\right),$$

wherein $\theta_y$ is the pitch angle of the gimbal, y is a y-axis coordinate, in the image coordinates, of the target object, H is the image pixel height, and $\theta_h$ is the vertical field of view.

10. The control terminal according to claim 9, wherein the processor is further configured to acquire the image coordinates of the target object by means of a click/tap operation of the user on the display screen.

11. The control terminal according to claim 9, wherein the processor is further configured to calculate the yaw angle of the gimbal according to the following formula:

$$\theta_x = \tan^{-1}\left(\frac{\left|x - \frac{W}{2}\right|}{\frac{W}{2}}\right),$$

wherein $\theta_x$ is the yaw angle of the gimbal, x is an x-axis coordinate, in the image coordinates, of the target object, W is the image pixel width, and $\theta_w$ is the horizontal field of view.

12. The control terminal according to claim 9, wherein the preset position is a center of the captured image.

13. An aircraft system, comprising:

an unmanned aerial vehicle (UAV), comprising a fuselage, a gimbal and a photographing device, wherein the photographing device is mounted to the gimbal, and the gimbal is mounted to the fuselage; and a control terminal, communicatively connected to the UAV and configured to control the gimbal, wherein the gimbal carries the photographing device, and the control terminal comprises:

a housing;

a display screen, connected to the housing;

at least one processor, disposed in the housing; and a memory, communicatively connected to the at least one processor, wherein the processor is configured to:

acquire photographing parameter information of the photographing device, wherein the photographing parameter information comprises a field of view of the photographing device and a resolution of a captured image of the photographing device;

acquire image coordinates of a target object in the captured image that is selected by a user; and control an attitude of the gimbal according to the photographing parameter information and the image coordinates of the target object, so that the target object is at a preset position in the captured image;

wherein the resolution of the captured image comprises an image pixel width and an image pixel height, and the field of view comprises a horizontal field of view and a vertical field of view; and the processor is further configured to:

calculate a pitch angle of the gimbal according to the image coordinates of the target object, the image pixel height and the vertical field of view;

calculate a yaw angle of the gimbal according to the image coordinates of the target object, the image pixel width and the horizontal field of view; and control the attitude of the gimbal according to the pitch angle and the yaw angle, so that the target object is at the preset position in the captured image;

wherein the processor is further configured to calculate the pitch angle of the gimbal according to the following formula:

$$\theta_y = \tan^{-1}\left(\frac{\left|y - \frac{H}{2}\right|}{\frac{H}{2}}\right).$$

wherein $\theta_y$ is the pitch angle of the gimbal, y is a y-axis coordinate, in the image coordinates, of the target object, H is the image pixel height, and $\theta_h$ is the vertical field of view.

* * * * *